(12) United States Patent
Li et al.

(10) Patent No.: US 11,911,948 B2
(45) Date of Patent: Feb. 27, 2024

(54) STARCH-BASED MULTI-CHANNEL AIRFLOW UNIT AND PREPARATION METHOD AND APPLICATION THEREOF

(71) Applicant: CHINA TOBACCO GUANGDONG INDUSTRIAL CO., LTD., Guangdong (CN)

(72) Inventors: Feng Li, Guangdong (CN); Jing Hu, Guangdong (CN); Ruifeng Zhao, Guangdong (CN); Donge Chen, Guangdong (CN); Zhenfu Li, Guangdong (CN); Yibo Liu, Guangdong (CN); Xi Liu, Guangdong (CN); Huanwei Li, Guangdong (CN)

(73) Assignee: CHINA TOBACCO GUANGDONG INDUSTRIAL CO., LTD., Guangdong (CN)

( * ) Notice: Subject to any disclaimer, the term of this patent is extended or adjusted under 35 U.S.C. 154(b) by 546 days.

(21) Appl. No.: 17/259,562

(22) PCT Filed: Jul. 12, 2019

(86) PCT No.: PCT/CN2019/095700
§ 371 (c)(1),
(2) Date: Jan. 12, 2021

(87) PCT Pub. No.: WO2020/258387
PCT Pub. Date: Dec. 30, 2020

(65) Prior Publication Data
US 2021/0323210 A1   Oct. 21, 2021

(30) Foreign Application Priority Data
Jun. 27, 2019   (CN) .......................... 201910567349.6

(51) Int. Cl.
*B29C 48/28*   (2019.01)
*B29C 48/29*   (2019.01)
(Continued)

(52) U.S. Cl.
CPC ............ *B29C 48/11* (2019.02); *A24D 3/0237* (2013.01); *A24D 3/0287* (2013.01); *A24D 3/04* (2013.01); *A24D 3/08* (2013.01); *B29C 48/022* (2019.02); *B29C 48/288* (2019.02); *B29C 48/40* (2019.02); *B29C 48/682* (2019.02); *B29C 48/802* (2019.02); *B29C 48/88* (2019.02); *B29C 48/901* (2019.02); *B29C 48/9115* (2019.02); *B29C 48/92* (2019.02); *C08B 30/14* (2013.01); *C08K 5/053* (2013.01); *C08L 67/04* (2013.01); *D01F 6/625* (2013.01); *B29C 48/0022* (2019.02); *B29C 2793/009* (2013.01); *B29C 2948/9258* (2019.02); *B29C 2948/92209* (2019.02); *B29C 2948/92704* (2019.02); *B29K 2003/00* (2013.01); *B29K 2067/046* (2013.01); *B29L 2031/601* (2013.01); *B29L 2031/608* (2013.01);
(Continued)

(58) Field of Classification Search
CPC ..... B29C 48/0022; B29C 48/09; B29C 48/11; B29C 48/28; B29C 48/288; B29C 48/29; B29C 48/40; B29C 48/802; B29C 48/901; B29C 48/9115; B29C 48/92; B29C 2793/009; B29C 2948/92209; B29K 2003/00; B29K 2067/046; B29L 2031/601; B29L 2031/608; D01D 1/04; D01D 5/08; D01D 5/088; D01D 5/24; D01D 5/253; D01F 6/625; D10B 2331/041; D10B 2401/12
USPC ............. 264/40.6, 150, 151, 177.12, 177.14, 264/177.17, 177.19, 209.3, 209.7, 211.12, 264/211.21, 211.22, 211.23, 331.21, 564, 264/566, 568
See application file for complete search history.

(56) References Cited

U.S. PATENT DOCUMENTS 5,922,379 A  *  7/1999  Wang ...................... B29B 7/007
106/162.51
6,147,135 A     11/2000  Yuan et al.

FOREIGN PATENT DOCUMENTS

CN       1847294 A  * 10/2006  ............. B29C 48/40
CN     101914294 A  * 12/2010  ............. B29C 48/92
(Continued)

OTHER PUBLICATIONS

"International Search Report (Form PCT/ISA/210) of PCT/CN2019/095700", dated Mar. 25, 2020, with English translation thereof, pp. 1-4.
(Continued)

Primary Examiner — Leo B Tentoni
(74) Attorney, Agent, or Firm — Gang Yu

(57) ABSTRACT

The invention discloses a starch-based multi-channel airflow unit and a preparation method and an application thereof. The preparation method of the present invention comprises the following steps: melting a polylactic acid, wherein a temperature of a first temperature control zone is 135° C. to 145° C., a temperature of a second temperature control zone is 175° C. to 185° C., a temperature of a third temperature control zone is 190° C. to 200° C., and a temperature of a fourth temperature control zone is 175° C. to 185° C.; gelatinizing a starch-based material, adding the starch-based material in the third temperature control zone and fully mixing the mixture; adding a polyol in the third temperature control zone, and fully mixing the mixture; and extruding out the mixed material through twin screws, sizing in vacuum, cooling and sizing, and winding and cutting to obtain the starch-based multi-channel airflow unit.

8 Claims, No Drawings

(51) Int. Cl.
  *D01D 1/04* (2006.01)
  *D01D 5/088* (2006.01)
  *D01D 5/24* (2006.01)
  *D01D 5/253* (2006.01)
  *B29C 48/11* (2019.01)
  *B29C 48/88* (2019.01)
  *B29C 48/92* (2019.01)
  *B29C 48/00* (2019.01)
  *B29C 48/68* (2019.01)
  *B29C 48/40* (2019.01)
  *A24D 3/02* (2006.01)
  *A24D 3/04* (2006.01)
  *A24D 3/08* (2006.01)
  *C08B 30/14* (2006.01)
  *C08K 5/053* (2006.01)
  *C08L 67/04* (2006.01)
  *D01F 6/62* (2006.01)
  *B29C 48/285* (2019.01)
  *B29C 48/80* (2019.01)
  *B29C 48/90* (2019.01)
  *B29K 67/00* (2006.01)
  *B29L 31/60* (2006.01)

(52) U.S. Cl.
  CPC .... *D10B 2331/041* (2013.01); *D10B 2401/12* (2013.01)

(56) References Cited

FOREIGN PATENT DOCUMENTS

| | | |
|---|---|---|
| CN | 103584281 | 2/2014 |
| CN | 102838795 B | 5/2014 |
| CN | 104532386 | 4/2015 |
| CN | 1919926 A | 2/2017 |
| CN | 107119460 A | 9/2017 |
| CN | 107458055 | 12/2017 |
| CN | 108113051 | 6/2018 |
| CN | 108143004 | 6/2018 |
| CN | 108835710 A | 11/2018 |
| CN | 107458055 B | 2/2019 |
| CN | 109393558 A | 3/2019 |
| CN | 109691697 A | 4/2019 |
| KR | 101573986 B1 | 11/2015 |

OTHER PUBLICATIONS

"Written Opinion of the International Searching Authority (Form PCT/ISA/237) of PCT/CN2019/095700", dated Mar. 25, 2020, pp. 1-4.

* cited by examiner

US 11,911,948 B2

STARCH-BASED MULTI-CHANNEL AIRFLOW UNIT AND PREPARATION METHOD AND APPLICATION THEREOF

CROSS-REFERENCE TO RELATED APPLICATION

This application is a 371 of international application of PCT application serial no. PCT/CN2019/095700, filed on Jul. 12, 2019, which claims the priority benefit of China application no. 201910567349.6, filed on Jun. 27, 2019. The entirety of each of the above—mentioned patent applications is hereby incorporated by reference herein and made a part of this specification.

BACKGROUND

Technical Field

The present invention relates to the technical field of filter stick preparation, and more particularly, to a starch-based multi-channel airflow unit and a preparation method and an application thereof.

Description of Related Art

A temperature for heating a heat-not-burn cigarette is usually lower than 500° C., so that a variety of harmful ingredients in smoke can be greatly reduced, while aroma constituents are relatively less affected, and some aroma constituents may even increase due to the reduction of pyrolysis. Nicotine and most aroma constituents may be released from tobacco at a relatively low temperature (250° C. to 500° C.) and transferred into the smoke. Since a tobacco matrix is separated from a heating part in the heat-not-burn cigarette, electrical heating is a mainstream heating method currently. Although the electrical heating avoids a risk of igniting the tobacco, there is still a problem of a high smoke temperature during smoking. Especially, a length of the heat-not-burn cigarette is generally short at present, a cooling time and distance of the smoke are limited, the temperature of the smoke is high, and a hot and piquant feeling is strong. Therefore, how to develop a cooling material for the heat-not-burn cigarette with strong cooling effect is also a key research aspect of the heat-not-burn cigarette.

At present, there have been quite a lot of researches on using a polylactic acid (PLA) film as a smoke cooling material. Although the polylactic acid film has a cooling effect, the polylactic acid film is easy to shrink when heated, and the cooling effect also needs to be further improved. CN108143004A in the prior art discloses a smoke cooling material for a heat-not-burn cigarette and an application thereof. The cooling material is mainly a smoke cooling material for a heat-not-burn cigarette prepared by mixing a PLA polylactic acid polymer material with other materials and then modifying the same. A thermal shrinkage performance of the PLA polymer material is improved through a layered nano-material and a fiber nano-material to improve a cooling performance of the material. However, an overall cooling effect achieved is limited, and no technology for improving the related preparation process is disclosed.

SUMMARY

A technical problem to be solved by the present invention is to overcome the defects and deficiencies of poor performance and inability to realize high-efficiency strong temperature reduction of a cooling material for a heat-not-burn cigarette filter stick prepared by the existing method, and to provide a preparation method of a starch-based multi-channel airflow unit.

An objective of the present invention is to provide a starch-based multi-channel airflow unit prepared by the method above.

Another objective of the present invention is to provide an application of the starch-based multi-channel airflow unit in a heat-not-burn cigarette.

The above objectives of the present invention are achieved by the following technical solutions.

A preparation method of a starch-based multi-channel airflow unit includes the following steps:

S1: melting a polylactic acid, wherein a temperature of a first temperature control zone is 135° C. to 145° C., a temperature of a second temperature control zone is 175° C. to 185° C., a temperature of a third temperature control zone is 190° C. to 200° C., and a temperature of a fourth temperature control zone is 175° C. to 185° C.;

S2: gelatinizing a starch-based material, adding the starch-based material in the third temperature control zone, and fully mixing;

S3: adding a polyol in the third temperature control zone, and fully mixing; and S4: extruding out the mixed material by twin screws, sizing in vacuum, cooling and sizing, and winding and cutting to obtain the starch-based multi-channel airflow unit.

The starch in S2 is gelatinized to form a flowing viscous paste system, added in the third temperature control zone, and fully mixed by screws.

In S3, the softening material is mixed, and the polyol, such as a glycerol and a propylene glycol, is added in the fourth temperature control zone by pumping with a pressure pump with a pumping pressure of 0.15 MPa to 0.25 MPa.

Preferably, the obtained starch-based multi-channel airflow unit has a length within ±0.2 mm of a designed value, a circumference within ±0.20 mm of a designed value, and a wall thickness within ±0.025 mm of a designed value.

According to the present invention, under the condition that the gelatinized starch is swelled by water, the starch has the characteristic of self-adhesion, the phase change material polylactic acid has the effects of absorbing and storing heat, reducing an airflow temperature, and meanwhile, it makes the material to have better adhesion and easy to be molded by screw extrusion. The addition of the softening material polyol softens the material and improves fluidity. Through a twin-screw extrusion and stretching process, the material is easy to be molded, and the molded multi-channel airflow unit is soft but rigid, and is easy to cut.

Preferably, in S1, the temperature of the first temperature control zone is 140° C., the temperature of the second temperature control zone is 180° C., the temperature of the third temperature control zone is 200° C., and the temperature of the fourth temperature control zone is 180° C.

Preferably, a heating rate of the second temperature control zone in S1 is 3° C./min to 10° C./min. For example, the heating rate of the second temperature control zone may be 3° C./min, 4° C./min, or 10° C./min. It is accidentally found by the inventors that controlling the heating rate of the second temperature control zone and realizing the rapid heating up of the first temperature control zone to the second temperature control zone to be melted can reduce damages to a molecular structure of the polylactic acid in the process, which is beneficial to keep the material structure stable.

Preferably, a heating rate of the third temperature control zone in S1 is 0.2° C./min to 2° C./min. The heating rate of the third temperature control zone may be 0.2° C./min, 1° C./min, or 2° C./min. It is also found by the inventors that controlling the heating rate of the zone 3 and realizing the slight heating up of the second temperature control zone to the third temperature control zone can make molecules of the polylactic acid melt fully without decomposition, so that various materials are mixed more sufficiently and evenly; and meanwhile, a molecular structure of the polylactic acid is unchanged.

In order to better protect the molecular structure of the polylactic acid and achieve a better cooling effect, more preferably, the heating rate of the second temperature control zone is 4° C./min, and the heating rate of the third temperature control zone is 1° C./min.

The starch of the present invention is preferably selected from corn starch, sweet potato starch, potato starch and lily starch, and a grain size of the starch material is preferably 10 μm to 100 μm.

Preferably, a specific operation of the gelatinizing the starch-based material in S2 is as follows: gelatinizing a mixed solution of a starch and water at 80° C. to 90° C. for 10 minutes to 30 minutes to form a gelatinized starch, wherein a mass percentage of the starch in the mixed solution is 4.5% to 14.5%. For example, the mass percentage of the starch in the mixed solution may be 4.5%, 10%, or 14.5%.

Setting of the gelatinizing temperature has an obvious influence on a gelatinizing effect. If the temperature is too low, the gelatinizing is slow, and more external forces are needed to accelerate the gelatinizing. At the same time, the gelatinizing has certain requirements on a water content. Too much water, the viscosity is low, which makes it difficult to form paste, and affects a water content of the mixed material, making the mixed material difficult to process and mold, while too little water causes insufficient decomposition.

Preferably, a feeding speed of the polylactic acid in S1 is 0.05 kg/min to 0.10 kg/min, a feeding speed of the starch in S2 is 0.20 kg/min to 0.40 kg/min, and a feeding speed of the polyol in S3 is 0.05 kg/min to 0.10 kg/min.

Preferably, in S4, a rotating speed of the twin screws is 10 rpm to 30 rpm, and an extrusion speed of the material is 0.30 kg/min to 0.60 kg/min.

Preferably, in S4, a pulling rate of the winding is 5 m/min to 20 m/min, and a pulling force is 0.2 kN to 0.5 kN.

Preferably, a negative pressure of the sizing in vacuum in S4 is 0.05 MPa to 0.2 MPa.

Preferably, in S4, the cooling and sizing is water-cooling and sizing, a water temperature is 10° C. to 25° C., and a water circulation rate is 5 kg/min to 10 kg/min.

A starch-based multi-channel airflow unit prepared by the preparation method of the starch-based multi-channel airflow unit mentioned above is also within the scope of protection of the present invention.

An application of the starch-based multi-channel airflow unit in preparing a heat-not-burn cigarette filter stick is also within the scope of protection of the present invention.

A specific application mode may be as follows: a 23 mm starch-based pipe and a 7 mm acetate fiber serve as one basic unit combination, and one basic unit is applied to a heat-not-burn cigarette as a smoke filtering section, in which the acetate fiber section is located at a downstream end (lip end) of smoke, the starch-based pipe is located at an upstream end of the smoke, and a temperature difference between the two ends of the starch-based pipe is between 70° C. and 120° C., indicating that the starch-based pipe unit has a strong cooling effect.

Compared with the prior art, the present invention has the following beneficial effects.

(1) The present invention provides the preparation method of the starch-based multi-channel airflow unit. By setting the specific temperatures of the four zones in the process of melting and mixing the materials, the first zone to the second zone is rapidly heated up to be melted, which reduces the damages to the molecular structure of the polylactic acid in the process of melting and mixing. Now, the slight heating up of the second zone to the third zone can make the molecules of the polylactic acid melt fully without decomposition, thus achieving the effect of stable structure, and the cooling effect can reach 120° C.

(2) The starch-based cooling material prepared by the present invention has an excellent thermoplastic property, is convenient for processing and molding, and effectively reduces interception of aroma constituents in the cigarette smoke.

DESCRIPTION OF THE EMBODIMENTS

The present invention will be further described below with reference to the specific embodiments, but the embodiments are not intended to limit the present invention in any form.

Unless otherwise indicated, the raw material reagents employed in the present invention are conventionally purchased raw material reagents.

Embodiment 1

A preparation method of a starch-based multi-channel airflow unit included the following steps:
S1: a polylactic acid was melted, wherein a temperature of a first temperature control zone was 140° C., a temperature of a second temperature control zone was 180° C., a temperature of a third temperature control zone was 200° C., a temperature of a fourth temperature control zone was 180° C., and a molecular weight of the polylactic acid was 15,000;
S2: a starch-based material was gelatinized, added in the third temperature control zone, and fully mixed;
S3: a polyol was added in the third temperature control zone, and fully mixed; and
S4: the mixed material was extruded out by twin screws, sized in vacuum, cooled and sized, and wound and cut to obtain the starch-based multi-channel airflow unit.

A heating rate of the second temperature control zone was 3° C./min, and a heating rate of the third temperature control zone was 0.2° C./min.

A feeding speed of the polylactic acid in S1 was 0.05 kg/min, a feeding speed of the starch in S2 was 0.20 kg/min, and a feeding speed of the polyol in S3 was 0.05 kg/min.

Embodiment 2

A preparation method of a starch-based multi-channel airflow unit included the following steps:
S1: a polylactic acid was melted, wherein a temperature of a first temperature control zone was 140° C., a temperature of a second temperature control zone was 180° C., a temperature of a third temperature control zone was 200° C., a temperature of a fourth temperature control zone was 180° C., and a molecular weight of the polylactic acid was 15,000;

S2: a starch-based material was gelatinized, added in the third temperature control zone, and fully mixed;

S3: a polyol was added in the third temperature control zone, and fully mixed; and S4: the mixed material was extruded out by twin screws, sized in vacuum, cooled and sized, and wound and cut to obtain the starch-based multi-channel airflow unit.

A heating rate of the second temperature control zone was 10° C./min, and a heating rate of the third temperature control zone was 2° C./min.

A feeding speed of the polylactic acid in S1 was 0.10 kg/min, a feeding speed of the starch in S2 was 0.40 kg/min, and a feeding speed of the polyol in S3 was 0.10 kg/min.

Embodiment 3

A preparation method of a starch-based multi-channel airflow unit included the following steps:
S1: a polylactic acid was melted, wherein a temperature of a first temperature control zone was 140° C., a temperature of a second temperature control zone was 180° C., a temperature of a third temperature control zone was 200° C., a temperature of a fourth temperature control zone was 180° C., and a molecular weight of the polylactic acid was 15,000;
S2: a starch-based material was gelatinized, added in the third temperature control zone, and fully mixed;
S3: a polyol was added in the third temperature control zone, and fully mixed; and
S4: the mixed material was extruded out by twin screws, sized in vacuum, cooled and sized, and wound and cut to obtain the starch-based multi-channel airflow unit.

A heating rate of the second temperature control zone was 4° C./min, and a heating rate of the third temperature control zone was 1° C./min.

A feeding speed of the polylactic acid in S1 was 0.07 kg/min, a feeding speed of the starch in S2 was 0.30 kg/min, and a feeding speed of the polyol in S3 was 0.08 kg/min.

Embodiment 4

A preparation method of a starch-based multi-channel airflow unit included the following steps:
S1: a polylactic acid was melted, wherein a temperature of a first temperature control zone was 140° C., a temperature of a second temperature control zone was 180° C., a temperature of a third temperature control zone was 200° C., a temperature of a fourth temperature control zone was 180° C., and a molecular weight of the polylactic acid was 15,000;
S2: a starch-based material was gelatinized, added in the third temperature control zone, and fully mixed;
S3: a polyol was added in the third temperature control zone, and fully mixed; and
S4: the mixed material was extruded out by twin screws, sized in vacuum, cooled and sized, and wound and cut to obtain the starch-based multi-channel airflow unit.

A heating rate of the second temperature control zone was 4° C./min, and a heating rate of the third temperature control zone was 1° C./min.

A feeding speed of the polylactic acid in S1 was 0.07 kg/min, a feeding speed of the starch in S2 was 0.30 kg/min, and a feeding speed of the polyol in S3 was 0.08 kg/min.

A grain size of the starch material was 10 μm, and the starch was gelatinized as follows:
a mixed solution of a starch and water was gelatinized at 90° C. for 10 minutes to form a gelatinized starch, wherein a mass percentage of the starch in the mixed solution was 4.5%.

Embodiment 5

A preparation method of a starch-based multi-channel airflow unit included the following steps:
S1: a polylactic acid was melted, wherein a temperature of a first temperature control zone was 140° C., a temperature of a second temperature control zone was 180° C., a temperature of a third temperature control zone was 200° C., a temperature of a fourth temperature control zone was 180° C., and a molecular weight of the polylactic acid was 15,000;
S2: a starch-based material was gelatinized, added in the third temperature control zone, and fully mixed;
S3: a polyol was added in the third temperature control zone, and fully mixed; and
S4: the mixed material was extruded out by twin screws, sized in vacuum, cooled and sized, and wound and cut to obtain the starch-based multi-channel airflow unit.

A heating rate of the second temperature control zone was 4° C./min, and a heating rate of the third temperature control zone was 1° C./min. A feeding speed of the polylactic acid in S1 was 0.07 kg/min, a feeding speed of the starch in S2 was 0.30 kg/min, and a feeding speed of the polyol in S3 was 0.08 kg/min.

A grain size of the starch material was 10 μm, and the starch was gelatinized as follows:
a mixed solution of a starch and water was gelatinized at 90° C. for 10 minutes to form a gelatinized starch, wherein a mass percentage of the starch in the mixed solution was 14.5%.

Embodiment 6

A preparation method of a starch-based multi-channel airflow unit included the following steps:
S1: a polylactic acid was melted, wherein a temperature of a first temperature control zone was 140° C., a temperature of a second temperature control zone was 180° C., a temperature of a third temperature control zone was 200° C., a temperature of a fourth temperature control zone was 180° C., and a molecular weight of the polylactic acid was 15,000;
S2: a starch-based material was gelatinized, added in the third temperature control zone, and fully mixed;
S3: a polyol was added in the third temperature control zone, and fully mixed; and
S4: the mixed material was extruded out by twin screws, sized in vacuum, cooled and sized, and wound and cut to obtain the starch-based multi-channel airflow unit.

A heating rate of the second temperature control zone was 4° C./min, and a heating rate of the third temperature control zone was 1° C./min. A feeding speed of the polylactic acid in S1 was 0.07 kg/min, a feeding speed of the starch in S2 was 0.30 kg/min, and a feeding speed of the polyol in S3 was 0.08 kg/min.

A grain size of the starch material was 10 μm, and the starch was gelatinized as follows:
a mixed solution of a starch and water was gelatinized at 90° C. for 10 minutes to form a gelatinized starch, wherein a mass percentage of the starch in the mixed solution was 10%.

Embodiment 7

A preparation method of a starch-based multi-channel airflow unit included the following steps:

S1: a polylactic acid was melted, wherein a temperature of a first temperature control zone was 140° C., a temperature of a second temperature control zone was 180° C., a temperature of a third temperature control zone was 200° C., a temperature of a fourth temperature control zone was 180° C., and a molecular weight of the polylactic acid was 15,000;

S2: a starch-based material was gelatinized, added in the third temperature control zone, and fully mixed;

S3: a polyol was added in the third temperature control zone, and fully mixed; and S4: the mixed material was extruded out by twin screws, sized in vacuum, cooled and sized, and wound and cut to obtain the starch-based multi-channel airflow unit.

A heating rate of the second temperature control zone was 4° C./min, and a heating rate of the third temperature control zone was 1° C./min. A feeding speed of the polylactic acid in S1 was 0.07 kg/min, a feeding speed of the starch in S2 was 0.30 kg/min, and a feeding speed of the polyol in S3 was 0.08 kg/min.

A grain size of the starch material was 10 μm, and the starch was gelatinized as follows:

a mixed solution of a starch and water was gelatinized at 90° C. for 10 minutes to form a gelatinized starch, wherein a mass percentage of the starch in the mixed solution was 10%.

In S4, a rotating speed of the twin screws was 20 rpm, an extrusion speed of the material was 0.30 kg/min, a pulling rate of the winding was 5 m/min, a pulling force was 0.2 kN, a negative pressure of the sizing in vacuum was 0.05 MPa, the cooling and sizing was water-cooling and sizing, a water temperature was 10° C., and a water circulation rate was 5 kg/min.

Embodiment 8

A preparation method of a starch-based multi-channel airflow unit included the following steps:

S1: a polylactic acid was melted, wherein a temperature of a first temperature control zone was 140° C., a temperature of a second temperature control zone was 180° C., a temperature of a third temperature control zone was 200° C., a temperature of a fourth temperature control zone was 180° C., and a molecular weight of the polylactic acid was 15,000;

S2: a starch-based material was gelatinized, added in the third temperature control zone, and fully mixed;

S3: a polyol was added in the third temperature control zone, and fully mixed; and S4: the mixed material was extruded out by twin screws, sized in vacuum, cooled and sized, and wound and cut to obtain the starch-based multi-channel airflow unit.

A heating rate of the second temperature control zone was 4° C./min, and a heating rate of the third temperature control zone was 1° C./min. A feeding speed of the polylactic acid in S1 was 0.07 kg/min, a feeding speed of the starch in S2 was 0.30 kg/min, and a feeding speed of the polyol in S3 was 0.08 kg/min.

A grain size of the starch material was 10 μm, and the starch was gelatinized as follows:

a mixed solution of a starch and water was gelatinized at 90° C. for 10 minutes to form a gelatinized starch, wherein a mass percentage of the starch in the mixed solution was 10%.

In S4, a rotating speed of the twin screws was 20 rpm, an extrusion speed of the material was 0.60 kg/min, a pulling rate of the winding was 10 m/min, a pulling force was 0.3 kN, a negative pressure of the sizing in vacuum was 0.1 MPa, the cooling and sizing was water-cooling and sizing, a water temperature was 10° C., and a water circulation rate was 10 kg/min.

Embodiment 9

A preparation method of a starch-based multi-channel airflow unit included the following steps:

S1: a polylactic acid was melted, wherein a temperature of a first temperature control zone was 140° C., a temperature of a second temperature control zone was 180° C., a temperature of a third temperature control zone was 200° C., a temperature of a fourth temperature control zone was 180° C., and a molecular weight of the polylactic acid was 15,000;

S2: a starch-based material was gelatinized, added in the third temperature control zone, and fully mixed;

S3: a polyol was added in the third temperature control zone, and fully mixed; and S4: the mixed material was extruded out by twin screws, sized in vacuum, cooled and sized, and wound and cut to obtain the starch-based multi-channel airflow unit.

A heating rate of the second temperature control zone was 4° C./min, and a heating rate of the third temperature control zone was 1° C./min. A feeding speed of the polylactic acid in S1 was 0.07 kg/min, a feeding speed of the starch in S2 was 0.30 kg/min, and a feeding speed of the polyol in S3 was 0.08 kg/min.

A grain size of the starch material was 10 μm, and the starch was gelatinized as follows:

a mixed solution of a starch and water was gelatinized at 90° C. for 10 minutes to form a gelatinized starch, wherein a mass percentage of the starch in the mixed solution was 10%.

In S4, a rotating speed of the twin screws was 20 rpm, an extrusion speed of the material was 0.60 kg/min, a pulling rate of the winding was 20 m/min, a pulling force was 0.5 kN, a negative pressure of the sizing in vacuum was 0.1 MPa, the cooling and sizing was water-cooling and sizing, a water temperature was 10° C., and a water circulation rate was 10 kg/min.

Comparative Example 1

A preparation method of a starch-based multi-channel airflow unit included the following steps:

S1: a polylactic acid was melted, wherein a temperature of a first temperature control zone was 125° C., a temperature of a second temperature control zone was 165° C., a temperature of a third temperature control zone was 180° C., and a temperature of a fourth temperature control zone was 165° C.;

S2: a starch-based material was gelatinized, added in the third temperature control zone, and fully mixed;

S3: a polyol was added in the third temperature control zone, and fully mixed; and S4: the mixed material was extruded out by twin screws, sized in vacuum, cooled and sized, and wound and cut to obtain the starch-based multi-channel airflow unit.

Comparative Example 2

A preparation method of a starch-based multi-channel airflow unit included the following steps:

S1: a polylactic acid was melted, wherein a temperature of a first temperature control zone was 155° C., a temperature of a second temperature control zone was 195° C., a temperature of a third temperature control zone was 210° C., and a temperature of a fourth temperature control zone was 195° C.;

S2: a starch-based material was gelatinized, added in the third temperature control zone, and fully mixed;

S3: a polyol was added in the third temperature control zone, and fully mixed; and S4: the mixed material was extruded out by twin screws, sized in vacuum, cooled and sized, and wound and cut to obtain the starch-based multi-channel airflow unit.

Result Detection

Cooling Effect Detection of Material

The cooling materials prepared in Embodiments 1 to 9 and Comparative Examples 1 to 2 were prepared into the corresponding heat-not-burn cigarette filter sticks. The filter stick included a cooling material section and an acetate fiber section. The corresponding filter sticks were applied to the heat-not-burn cigarettes, temperatures at both ends of the cooling materials were detected, and related temperature differences were recorded, which were the cooling effects. A length of the cooling material section was 23 mm, and a length of the acetate fiber section was 7 mm.

The detection results were as shown in Table 1:

TABLE 1

| Serial number | Cooling effect/° C. |
|---|---|
| Embodiment 1 | 113 |
| Embodiment 2 | 105 |
| Embodiment 3 | 120 |
| Embodiment 4 | 111 |
| Embodiment 5 | 98 |
| Embodiment 6 | 85 |
| Embodiment 7 | 99 |
| Embodiment 8 | 106 |
| Embodiment 9 | 78 |
| Comparative Example 1 | 68 |
| Comparative Example 2 | 65 |

Obviously, the above-mentioned embodiments of the present invention are merely examples for clearly illustrating the present invention, but are not intended to limit the implementations of the present invention. For those of ordinary skills in the art, other different forms of changes or variations can be made on the basis of the above description. It is not necessary or possible to exhaust all the implementations here. Any modifications, equivalent substitutions, and improvements made within the spirit and principle of the present invention shall all fall within the scope of protection claimed by the present invention.

What is claimed is:

1. A preparation method of a starch-based multi-channel airflow unit, characterized in that, the method comprises the following steps:

S1: melting a polylactic acid, wherein a temperature of a first temperature control zone is 135° C. to 145° C., a temperature of a second temperature control zone is 175° C. to 185° C., a temperature of a third temperature control zone is 190° C. to 200° C., and a temperature of a fourth temperature control zone is 175° C. to 185° C.;

S2: gelatinizing a starch-based material, adding the starch-based material in the third temperature control zone, and fully mixing;

S3: adding a polyol in the third temperature control zone, and fully mixing; and S4: extruding out the mixed material by twin screws, sizing in vacuum, cooling and sizing, and winding and cutting to obtain the starch-based multi-channel airflow unit.

2. The preparation method according to claim 1, characterized in that, a heating rate of the second temperature control zone in S1 is 3° C./min to 10° C./min.

3. The preparation method according to claim 2, characterized in that, a heating rate of the third temperature control zone in S1 is 0.2° C./min to 2° C./min.

4. The preparation method according to claim 1, characterized in that, an operation of the gelatinizing the starch-based material in S2 is as follows: gelatinizing a mixed solution of a starch and water at 80° C. to 90° C. for 10 minutes to 30 minutes to form a gelatinized starch, wherein a mass percentage of the starch in the mixed solution is 4.5% to 14.5%.

5. The preparation method according to claim 3, characterized in that, a feeding speed of the polylactic acid in S1 is 0.05 kg/min to 0.10 kg/min, a feeding speed of the starch-based material in S2 is 0.20 kg/min to 0.40 kg/min, and a feeding speed of the polyol in S3 is 0.05 kg/min to 0.10 kg/min.

6. The preparation method according to claim 5, characterized in that, in S4, a rotating speed of the twin screws is 10 rpm to 30 rpm, and an extrusion speed of the mixed material is 0.30 kg/min to 0.60 kg/min.

7. The preparation method according to claim 6, characterized in that, in S4, a pulling rate of the winding is 5 m/min to 20 m/min, and a pulling force is 0.2 kN to 0.5 kN.

8. The preparation method according to claim 7, characterized in that, in S4, the cooling and sizing is water-cooling and sizing, a water temperature is 10° C. to 25° C., and a water circulation rate is 5 kg/min to 10 kg/min.

* * * * *